United States Patent [19]

Bristol

[11] Patent Number: 5,217,037
[45] Date of Patent: Jun. 8, 1993

[54] HOMOGENIZING APPARATUS HAVING MAGNETOSTRICTIVE ACTUATOR ASSEMBLY

[75] Inventor: John M. Bristol, Rye, N.H.
[73] Assignee: APV Gaulin, Inc., Wilmington, Mass.
[21] Appl. No.: 800,449
[22] Filed: Nov. 26, 1991
[51] Int. Cl.$^5$ ............................................. G05D 16/20
[52] U.S. Cl. .................. 137/14; 251/129.04; 251/129.06
[58] Field of Search ...................... 137/82, 270, 1, 14, 137/565; 251/129.04, 129.06

[56] References Cited

U.S. PATENT DOCUMENTS

| | | | |
|---|---|---|---|
| 2,481,214 | 9/1949 | Harper | 137/270 |
| 2,887,294 | 5/1959 | Hahn | 251/129.06 |
| 3,174,716 | 3/1965 | Salter | 251/129.06 |
| 3,752,189 | 8/1973 | Marr | 251/129.04 X |
| 4,158,368 | 6/1979 | Clark | 251/129.06 X |
| 4,566,485 | 1/1986 | Ruhle | 251/368 X |
| 4,662,392 | 5/1987 | Vadasz | 251/368 X |
| 4,705,062 | 11/1987 | Baker | 251/368 X |
| 4,773,833 | 9/1988 | Wilkinson et al. | 417/539 |
| 4,832,075 | 5/1989 | Dubach | 251/368 X |
| 4,858,650 | 8/1989 | Devaud | 251/129.04 X |
| 5,069,422 | 12/1991 | Kawamura | 251/129.04 X |

FOREIGN PATENT DOCUMENTS 4037957 11/1990 Fed. Rep. of Germany .

OTHER PUBLICATIONS

Murray, Charles J. "Magentostrictive Rods Aid Transducer, Actuator Design" Design News, Jun. 6, 1988, pp. 140-141, (Circle No. 247).

Primary Examiner—Alan Cohan
Attorney, Agent, or Firm—Hamilton, Brook, Smith & Reynolds

[57] ABSTRACT

A homogenizer comprises a homogenizing valve mounted to a pump block. The homogenizing valve includes a valve seat and a valve member positioned adjacent to the valve seat forming a gap through which fluid is expressed during homogenization. The homogenizer also comprises magnetostrictive actuator assembly which maintains a process pressure by controlling the size of the gap. The actuator assembly includes a magnetostrictive member which is coupled to the valve member and a generator for applying a magnetic field to the magnetostrictive member. The presence of the magnetic field produces magnetostriction of the magnetostrictive member which causes actuation of the valve member, thereby adjusting the size of the gap.

29 Claims, 2 Drawing Sheets ized product.

HOMOGENIZING APPARATUS HAVING MAGNETOSTRICTIVE ACTUATOR ASSEMBLY

BACKGROUND

Homogenization is the breaking down and mixing of the components of an emulsion or dispersion. A major use of homogenizers is to break down and disperse milk fat into the bulk of skim milk. This delays creaming of milk fat globules. Homogenizers are also used to process other emulsions such as silicon oil and to process dispersions such as pigments, antacids and various paper coatings.

In the most widely used type of homogenizer, the emulsion is introduced at high pressure of 500 psi to 10,000 psi to a central bore within an annular valve seat. The emulsion is forced out through a narrow gap between the valve seat and a valve member. Through the gap, the emulsion undergoes extremely rapid acceleration as well as an extreme drop in pressure. This violent action through the valve breaks down globules within the emulsion to produce the homogenized product.

The degree of homogenization is a function of the difference between the pressure of the emulsion at the inlet of the valve and the pressure at the outlet. In the past, homogenizers have not typically been required to operate at inlet pressures of greater than 10,000 psi. However, recent applications such as cell disruption have required significantly higher inlet pressures of about 15,000 psi or more.

A typical homogenizer system includes a homogenizer valve mounted to the side of a pump block. The pump is a plunger pump having multiple plungers which draw from a common suction manifold and discharge into a common discharge manifold delivering high pressure fluid to the homogenizer valve. For a constant flow rate provided by the pump, a desired homogenizing pressure is maintained by adjusting the gap between the valve member and the valve seat. In conventional systems, that adjustment is made by an actuator assembly. One type of actuator assembly is a spring-loaded handwheel which requires manual manipulation to adjust the homogenizing pressure. Another type of actuator assembly is a hydraulic or pneumatic valve actuator system. The hydraulic or pneumatic system provides for regulation of process pressure via a valve on a control panel, eliminating the need for manual handwheel adjustments.

SUMMARY OF THE INVENTION

In the present invention, a homogenizing apparatus employs a magnetostrictive actuator assembly which maintains a particular process pressure by controlling the size of the gap between the valve member and the valve seat. Magnetostrictive materials are characterized by their ability to change in dimensions when placed in a magnetic field. Accordingly, the actuator assembly comprises a member formed of magnetostrictive material and coupled to the valve member. The actuator assembly also includes a power supply for applying a magnetic field to the magnetostrictive member which causes magnetostriction along its longitudinal axis. Magnetostriction of the magnetostrictive member causes actuation of the valve member, thereby adjusting the size of the gap. The magnitude of the field is controllable such that the gap can be adjusted to maintain any one of a wide range of desired process pressures.

In a detailed embodiment of the present invention, the homogenizing apparatus comprises an annular valve seat having a central bore into which fluid enters during homogenization. A valve member is positioned adjacent to the valve seat forming a gap through which fluid is pushed during homogenization. In accordance with the present invention, the actuator assembly comprises the magnetostrictive member coupled to the valve member for adjusting the gap. More specifically, the actuator assembly includes a wire which is wrapped in the form of a coil around the magnetostrictive member. The controllable current source provides electric current which flows through the coil producing a corresponding magnetic field directed longitudinally through the magnetostrictive member. The presence of the magnetic field causes magnetostriction in the longitudinal direction of the magnetostrictive member causing actuation of the valve member and changing the size of the gap. Preferably, the magnetostrictive actuator assembly is capable of adjusting the width of the gap from 0.0002 to 0.0100 inches such that process pressures ranging from 1,000 to 20,000 PSI are available.

The magnetostrictive actuator assembly may be coupled to an existing control panel of the homogenizing system, the panel having a knob or the like for fingertip regulation of the current source. A sensing coil for measuring the process pressure may also be provided. The sensing coil is wrapped around the magnetostrictive member adjacent to the actuation coil and obtains a signal indicative of the process pressure associated with a particular gap width. Preferably, the signal is converted to a pressure indication and displayed on a meter at the control panel.

A magnetostrictive actuator assembly of the present invention offers several advantages over a pneumatic or hydraulic actuator assembly. For example, one advantage is that the magnetostrictive actuator is simpler and smaller than a pneumatic or hydraulic actuator since no compressor or hydraulic pump is required. In fact, the magnetostrictive actuator controls the gap size using only three major components: a magnetostrictive member, a coil (wire) and a current source. Another advantage of the present invention is that the magnetostrictive actuator is electrically driven such that it responds faster to operator manipulation than a manual, pneumatic or hydraulic actuator. Further, the electronic drive mechanism combined with the magnetostrictive member of the present invention offers a more precise means for adjusting the gap size than the hydraulic system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed on illustrating the principles of the invention.

DETAILED DESCRIPTION OF THE INVENTION

Figure 1:
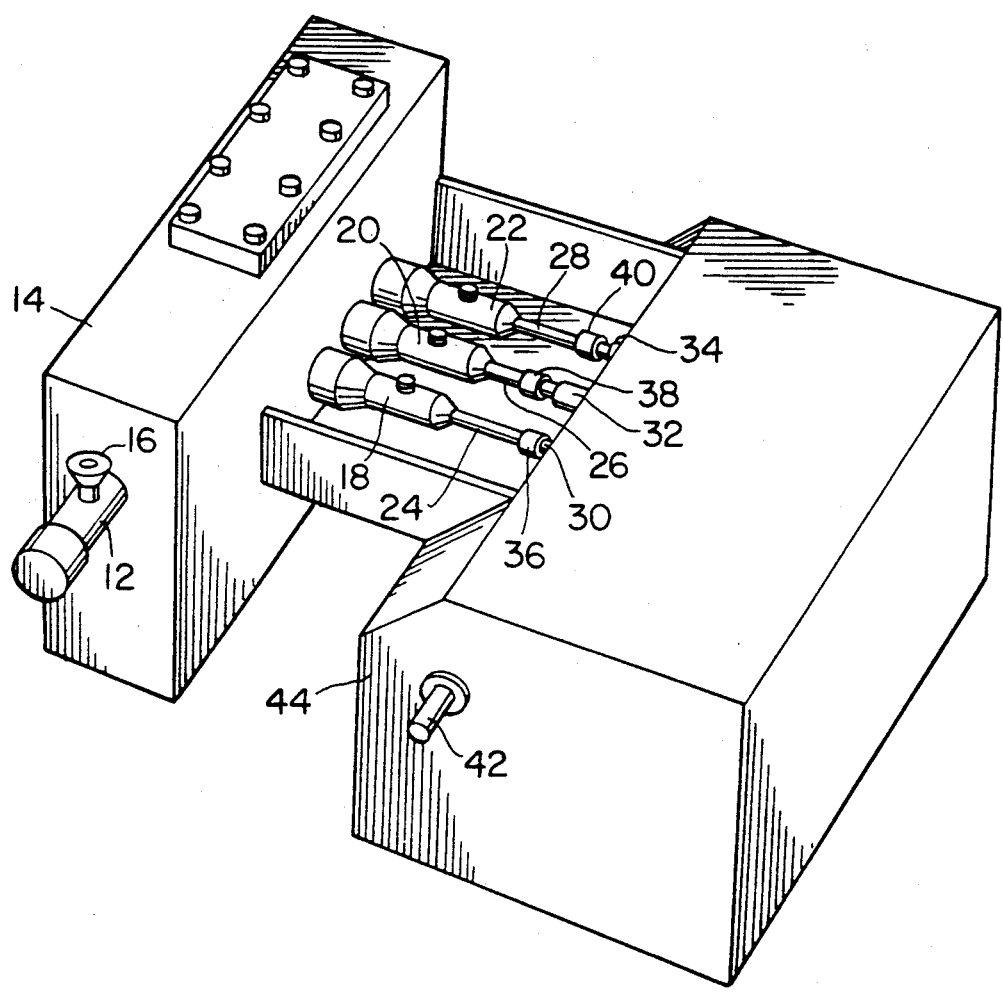
FIG. 1 is a perspective view of a homogenizer valve and pump assembly embodying the present invention.

FIG. 1 is a perspective view of a homogenizer system embodying the present invention. The view is from a direction which a user would consider to be the rear of the system to show the homogenizer valve 12 mounted to a pump block 14. The valve receives pressurized fluid from the pump, and the homogenized fluid is discharged through the flanged port 16.

The pump comprises three plunger pumps which operate, in parallel, 120° out of phase with each other. Each pump unit includes a cylinder packing box 18, 20 and 22 mounted to the block 14. A plunger 24, 26 and 28 is coupled to a respective drive shaft 30, 32 and 34 by means of a coupling 36, 38 and 40. The drive shafts are driven through an eccentric shaft 42 located in box 44 by an electric motor (not shown). A set of three suction valves are accessed through the bottom of the block 14, and a set of three discharge valves are accessed through the top of the block by removal of a plate 44.

The pump operation is in accordance with known operational principles such as those presented in U.S. Pat. No. 7,773,833 to Wilkinson et al. and those employed in Gaulin Homogenizer Model No. 30 CD and others. Fluid is provided to three pump chambers by the suction valves. The plungers 24, 26 and 28 drive the fluid from the chambers to the discharge valves. The pressurized fluid from the discharge valves is directed to the homogenizing valve 12.

Figure 2:
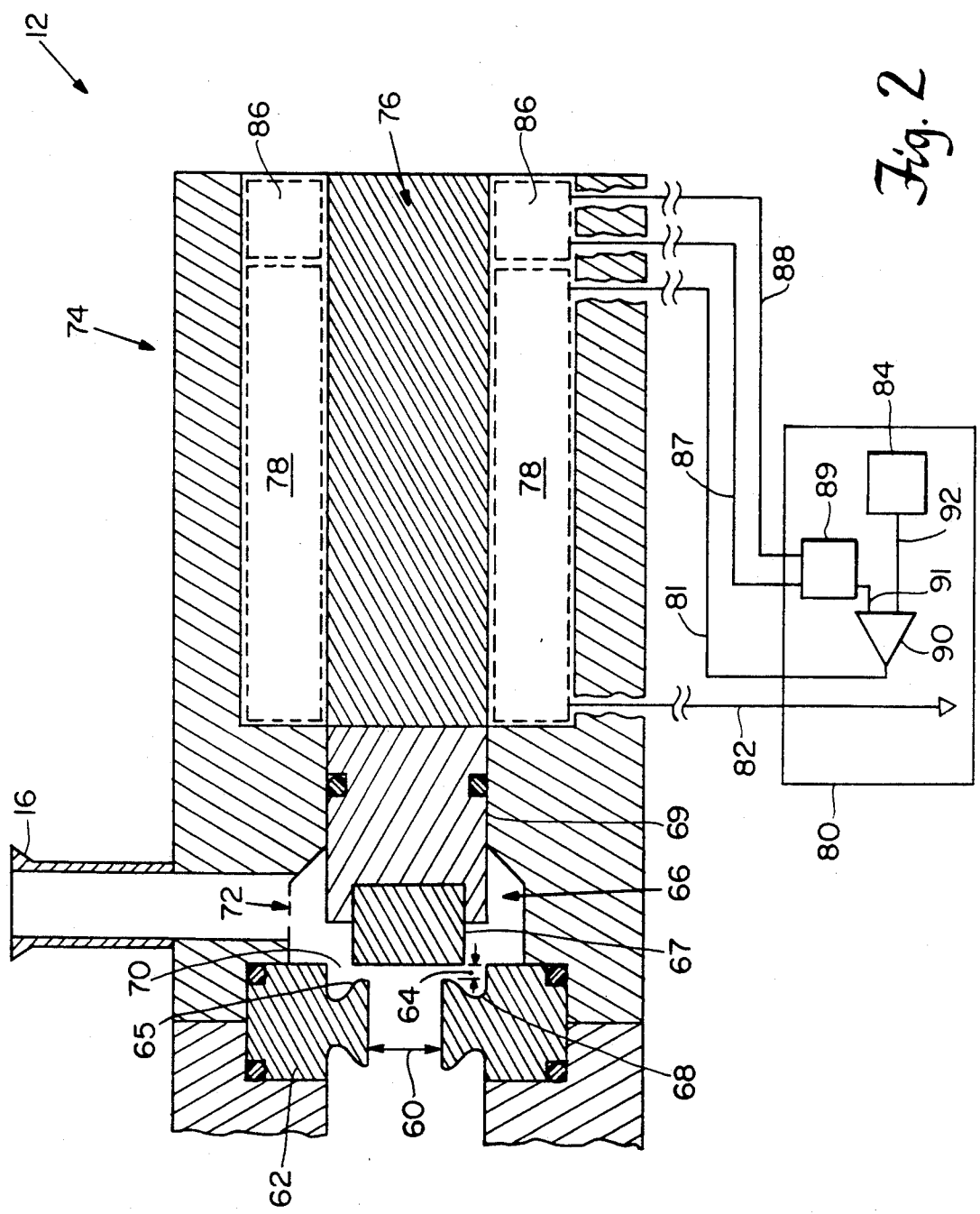
FIG. 2 is an enlarged view of a portion of the system of FIG. 1 illustrating a magnetostrictive actuator assembly of the present invention.

Referring to FIG. 2, the pressurized fluid is introduced into the valve 12 through a central bore 60 in an annular valve seat 62. The cylindrical bore 60 has a diameter preferably ranging from 0.06 to 2.00 inches. The valve seat has a groove 68 forming an impact surface in one of its faces concentric with the central bore 60 such that a ridge 65 is subsequently formed between the groove 68 and the central bore 60. A second groove and ridge are formed on the opposite face of the valve seat 62 for reversible use thereof.

The pressurized fluid is directed from the central bore 60 radially outward through a gap 64 formed between the ridge 65 and an adjacent valve member. The valve member is formed of a first portion 67 located adjacent to the valve seat 62 and a second portion 69 coupled to the actuator assembly 74. The first portion 67 and the valve seat 62 are formed of a hard material such as zirconia or tungsten carbide. The second portion 69 is formed of a transition material such as stainless steel. The impact surface 68 directs the fluid coming out of the gap 64 to an annulus 72 and the discharge port 16. The pump is a constant volume pump, so the process pressure is determined by adjusting the width of the gap 64.

In accordance with the present invention, the magnetostrictive actuator assembly 74 allows for adjusting the gap 64 to maintain a desired process pressure. Preferably, the assembly 74 is capable of providing a gap width ranging from 0.0002 to 0.0100 inches to maintain pressures ranging from 1000 to 20,000 PSI. The assembly 74 includes a member 76 formed of magnetostrictive material which is comprised of a plurality of ferromagnetic alloys. In a preferred embodiment, the magnetostrictive member 76 is formed of Terfenol ® manufactured by Edge Technologies. The member 76 has the ability to change its length (i.e. magnetostriction) along its longitudinal axis when a magnetic field is applied to it. To accomplish this, a wire 78 is wrapped around the member 76 in the form of a coil, and a current is supplied to the coil 78 via leads 81 and 82 by a controllable current device 80. The current flowing through the coil 78 produces a magnetic field directed longitudinally through the member 76. The magnetic field causes magnetostriction of the member 76 in the longitudinal direction such that the member 76 actuates the first portion 67 of the valve member by pushing against its second portion 69. The valve member is thus forced toward the valve seat 62, thereby reducing the size of the gap 64 and increasing the process pressure. If, subsequently, the process pressure is to be reduced, the current to the coil 78 is decreased which, in turn, reduces the magnetic field. A reduced magnetic field causes the member 76 to retract which actuates the valve member away from the valve seat 62, increasing the size of the gap 64.

The current device 80 may be manipulated to provide a range of input current to the coil for controlling the size of the gap 64. More specifically, the current device 80 may employ a servo-type circuit to control the current provided to the coil 78 in response to process pressure. To that end, a current regulator 84 controls the current provided to the coil 78. The regulator 84 may be coupled to a knob or a switch on the system control panel (not shown) for user manipulation of the current. As a possible means for monitoring the process pressure a sensing coil 86 may also be provided. The coil 86 is formed of a wire wrapped around a portion of the member 76 adjacent to the coil 78. The coil senses the magnetic field and generates an output on lines 87 and 88. A sensing circuit 89 receives this output and converts it to process pressure. The circuit 89 can also provide the servo-amp 90 with a feedback signal on line 91 corresponding to the process pressure. A command input signal on line 92 is provided by the regulator 84. For a particular process pressure, the regulator 84 is manipulated to adjust the current provided by the amplifier 90 to the coil 78.

While the invention has been particularly shown and described with reference to preferred embodiments thereof, it will be understood by those skilled in the art that various changes in form and details may be made therein without departing from the spirit and scope of the invention as defined by the appended claims.

I claim:

1. An apparatus for homogenizing a fluid at pressures greater than 1000 psi comprising:
   a pump for supplying fluid at a pressure greater than 1000 psi;
   a valve seat;
   a valve member spaced adjacent to the valve seat to provide a gap between the valve member and the valve seat through which the fluid is pumped; and
   an actuator assembly for actuating the valve member to adjust the gap, the actuator assembly comprising a member formed of magnetostrictive material and coupled to the valve member and a generator for providing a magnetic field which causes magnetostriction of the magnetostrictive member and actuation of the valve member to maintain a fluid pressure leading into the gap of greater than 1000 psi.

2. An apparatus as claimed in claim 1 wherein the actuator assembly further comprises a wire coil wrapped around the magnetostrictive member and coupled to the power supply which provides electric current to the wire coil for inducing a magnetic field through the magnetostrictive member causing magnetostriction thereof.

3. An apparatus as claimed in claim 1 wherein the actuator assembly further comprises:
a sensing coil coupled to the magnetostrictive member for sensing a magnetic field, the sensing coil generating a corresponding output in response to the magnetic field; and
a sensing circuit for converting the corresponding output into process pressure, the process pressure being associated with the gap.

4. An apparatus as claimed in claim 1 wherein the gap has an adjustable width ranging from 0.0002 to 0.0100 inches.

5. An apparatus as claimed in claim 1 wherein the valve seat has a central bore with a diameter ranging from 0.06 to 2.00 inches.

6. An apparatus as claimed in claim 1 wherein the magnetostrictive material comprises a plurality of ferromagnetic alloys.

7. An apparatus as claimed in claim 1 wherein magnetostriction of the magnetostrictive member is directed along its longitudinal axis.

8. An apparatus as claimed in claim 1 wherein the valve seat is formed of a hard material and the valve member has a first portion adjacent to the valve seat being formed of said hard material and a second portion coupled to the actuator being formed of a transition material.

9. An apparatus as claimed in claim 8 wherein the hard material is zirconia.

10. An apparatus as claimed in claim 8 wherein the hard material is tungsten carbide.

11. An apparatus as claimed in claim 8 wherein the transition material is stainless steel.

12. An apparatus as claimed in claim 1 wherein the valve seat is in the form of a rigid ring having a groove in one face thereof concentric with a central bore and having a ridge between the groove and the central bore, and the valve member having a face opposite to the ridge of valve seat forming the gap through which fluid is pumped.

13. An apparatus as claimed in claim 12 wherein the valve seat has a groove and a ridge on a second face thereof for reversible use of the valve seat.

14. An apparatus for homogenizing a fluid at pressures greater than 1000 psi comprising:
a constant volume pump for supplying fluid at a pressure greater than 1000 psi;
a valve seat;
a valve member spaced adjacent to the valve seat to provide a gap between the valve member and the valve set through which the fluid is pumped; and
an actuator assembly for actuating the valve member to adjust the gap, the actuator assembly comprising:
a member formed of magnetostrictive material connected to the valve member;
a wire coil wrapped around the magnetostrictive member; and
a current source providing electric current to the coil wire which produces a magnetic field directed through the magnetostrictive member causing magnetostriction of the magnetostrictive member and actuation of the valve member, thereby adjusting the gap to maintain a fluid pressure leading into the gap of greater than 1000 psi.

15. An apparatus as claimed in claim 14 wherein magnetostriction of the magnetostrictive member is directed along its longitudinal axis.

16. An apparatus as claimed in claim 14 wherein the actuator assembly further comprises:
a sensing coil coupled to the magnetostrictive member for sensing a magnetic field, the sensing coil generating a corresponding output in response to the magnetic field; and
a sensing circuit for converting the corresponding output into process pressure, the process pressure being associated with the gap.

17. An apparatus as claimed in claim 14 wherein the gap has an adjustable width ranging from 0.0002 to 0.0100 inches.

18. An apparatus as claimed in claim 14 wherein the valve seat has a central bore with a diameter ranging from 0.06 to 2.00 inches.

19. An apparatus as claimed in claim 14 wherein the valve set is in the form of a rigid ring having a groove in one face thereof concentric with a central bore and having a ridge between the groove and the central bore, and the valve member having a face opposite to the ridge of valve seat forming the gap through which fluid is pumped and subsequently impacted onto a surface.

20. An apparatus as claimed in claim 19 wherein the valve seat has a groove and a ridge on a second face thereof for reversible use of the valve seat.

21. An apparatus for homogenizing a fluid at pressures greater than 1000 psi comprising:
a constant volume pump for supplying fluid at a pressure greater than 1000 psi;
an annular valve seat having a central bore in which the fluid enters during homogenization, the valve seat being in the form of a rigid ring of hard material having a groove in one face thereof concentric with the central bore, said face also having a ridge portion between the groove and the central bore providing an impact surface;
a valve member spaced adjacent to the valve seat and having a face opposite to the ridge portion of the valve seat forming a gap through which the fluid is pumped, the valve member having a first portion adjacent to the ridge portion of the valve seat being formed of the hard material and a second portion being formed of a transition material; and
an actuator assembly for actuating the valve member to adjust the gap, the actuator assembly comprising:
a member formed of magnetostrictive material connected to second portion of the valve member;
a coil wrapped around the magnetostrictive member; and
a current source capable of providing electric current to the coil which produces a magnetic field directed through the magnetostrictive member causing magnetostriction of the magnetostrictive member in a direction perpendicular to said face of the valve member and actuation of the valve member along said axis thereby adjusting the gap to maintain a fluid pressure leading into the gap of greater than 1000 psi.

22. An apparatus as claimed in claim 21 wherein the valve seat has a groove and a ridge on a second face thereof for reversible use of the valve seat.

23. An apparatus as claimed in claim 21 the hard material is zirconia.

24. An apparatus as claimed in claim 21 wherein the hard material is tungsten carbide.

25. An apparatus as claimed in claim 21 wherein the transition material is stainless steel.

26. An apparatus as claimed in claim 21 wherein the actuator further comprises a sensing coil coupled to the magnetostrictive member for sensing a process pressure associated with the gap.

27. A method of controlling a gap between a valve seat and an adjacent valve member of a homogenizing apparatus at pressures greater than 1000 psi comprising the steps of:

providing an actuator assembly for actuating the valve member, wherein the actuator assembly comprises a member formed of magnetostrictive material and coupled to the valve member and a magnetic field generator coupled to the magnetostrictive member;

pumping fluid at a pressure greater than 1000 psi through said gap; and applying a magnetic field generated by the generator to the magnetostrictive member which causes magnetostriction of the magnetostrictive member and actuation of the valve member thereby adjusting the gap to maintain a fluid pressure leading into the gap of greater than 1000 psi.

28. A method as claimed in claim 27 further comprising sensing a process pressure associated with the gap using a sensing coil coupled to the magnetostrictive member.

29. A method of controlling a gap between a valve seat and an opposing valve member of a homogenizing apparatus at pressures greater than 1000 psi comprising the steps of:

providing an actuator assembly for actuating the valve member, actuator assembly comprising a member formed of magnetostrictive material and coupled to the valve member, a coil wrapped around the magnetostrictive member and a generator providing electric current to the coil;

pumping fluid with a constant volume pump at a pressure greater than 1000 psi through said gap; and controlling the electric current in the coil via the generator wherein the electric current in the coil produces a magnetic field directed through the magnetostrictive member which causes magnetostriction of the magnetostrictive member and actuation of the valve member thereby adjusting the gap to maintain a fluid pressure leading into the gap of greater than 1000 psi.

* * * * *